United States Patent
Lee et al.

(10) Patent No.: US 9,025,524 B2
(45) Date of Patent: May 5, 2015

(54) METHOD AND APPARATUS OF TRANSMITTING AND RECEIVING SYNCHRONIZATION SIGNAL IN A DISTRIBUTED ANTENNA SYSTEM

(75) Inventors: Hyun Woo Lee, Anyang-si (KR); Han Gyu Cho, Anyang-si (KR); Seung Hee Han, Anyang-si (KR)

(73) Assignee: LG Electronics Inc., Seoul (KR)

( * ) Notice: Subject to any disclaimer, the term of this patent is extended or adjusted under 35 U.S.C. 154(b) by 252 days.

(21) Appl. No.: 13/581,890

(22) PCT Filed: Mar. 10, 2011

(86) PCT No.: PCT/KR2011/001675
§ 371 (c)(1),
(2), (4) Date: Aug. 30, 2012

(87) PCT Pub. No.: WO2011/118927
PCT Pub. Date: Sep. 29, 2011

(65) Prior Publication Data
US 2012/0320831 A1  Dec. 20, 2012

Related U.S. Application Data

(60) Provisional application No. 61/317,676, filed on Mar. 25, 2010.

(30) Foreign Application Priority Data

Jan. 28, 2011 (KR) .......................... 10-2011-0008857

(51) Int. Cl.
H04W 56/00 (2009.01)
H04B 7/02 (2006.01)

(52) U.S. Cl.
CPC ........ *H04W 56/0085* (2013.01); *H04W 56/001* (2013.01); *H04B 7/022* (2013.01); *H04W 56/0015* (2013.01)

(58) Field of Classification Search
None
See application file for complete search history.

(56) References Cited

U.S. PATENT DOCUMENTS

| 2003/0072255 | A1 | 4/2003 | Ma et al. |
| 2006/0182080 | A1 | 8/2006 | Yang et al. |
| 2010/0177683 | A1* | 7/2010 | Lindoff et al. ............... 370/328 |
| 2011/0075748 | A1* | 3/2011 | Novak et al. ................. 375/260 |
| 2011/0105184 | A1* | 5/2011 | Piirainen et al. ........... 455/562.1 |
| 2011/0134827 | A1* | 6/2011 | Hooli et al. .................. 370/315 |

FOREIGN PATENT DOCUMENTS

| KR | 10-2004-0045865 A | 6/2004 |
| KR | 10-2006-0015221 A | 2/2006 |
| KR | 10-2008-0086338 A | 9/2008 |

* cited by examiner

*Primary Examiner* — Hassan Phillips
*Assistant Examiner* — Ayanah George
(74) *Attorney, Agent, or Firm* — Birch, Stewart, Kolasch & Birch, LLP

(57) ABSTRACT

A method and apparatus of transmitting and receiving a synchronization signal in a distributed antenna system (DAS) is disclosed. A method of receiving a synchronization signal in a mobile station of a distributed antenna system (DAS) comprises receiving a primary preamble from a base station through one of a plurality of distributed antennas, which is previously defined; and acquiring first synchronization using the primary preamble.

16 Claims, 10 Drawing Sheets

Small cell

Large cell

METHOD AND APPARATUS OF TRANSMITTING AND RECEIVING SYNCHRONIZATION SIGNAL IN A DISTRIBUTED ANTENNA SYSTEM

This application is the National Phase of PCT/KR2011/001675 filed on Mar. 10, 2011, which claims priority under 35 U.S.C. 119(e) to the U.S. Provisional Application No. 61/317,676 filed on Mar. 25, 2010 and under 35 U.S.C. 119(a) to Patent Application No. 10-2011-0008857 filed in the Republic of Korea on Jan. 28, 2011, all which are hereby expressly incorporated by reference into the present application.

TECHNICAL FIELD

The present invention relates to a wireless communication system, and more particularly, to a method and apparatus of transmitting and receiving a synchronization signal in a distributed antenna system.

BACKGROUND ART

Recently, a distributed antenna system (DAS) which uses distributed antennas within a cell has been discussed. FIG. 1 is a diagram illustrating comparison between a centralized antenna system (CAS) and a DAS.

As illustrated in FIG. 1, the DAS is a network of antennas connected to a common source through a transmission medium and spatially spaced apart from one another. The DAS can extend coverage and enhance energy efficiency. As an antenna is located near a mobile station, a shade zone can be removed, and stable connection between the antenna and the mobile station can be performed. Also, path loss or propagation loss is reduced, and power efficiency is increased as connection quality between a base station and a mobile station is improved.

FIG. 2 is a diagram illustrating an example of a method of using and configuring a DAS. In addition to the advantage of coverage extension, the DAS has an advantageous in that it increases capacity. FIG. 2(a) illustrates that the same signal from all antennas is repeatedly transmitted, and FIG. 2(b) illustrates that independent data is transmitted from each of all antennas. Theoretically, the DAS increases average link capacity as much as two times, approximately, in accordance with simple selection of antennas. In order to more improve system capacity, the DAS should support independent data transmission from each of the antennas.

The DAS may be used together with another technique such as a relay and femto cell. FIG. 3 is a diagram illustrating an example of configuring a DAS from a CAS having a femto cell.

In spite of the fact that the DAS has been discussed as above, a method how to acquire cell synchronization from a DAS in a mobile station and maintain the cell synchronization has not been developed.

DISCLOSURE OF INVENTION

Technical Problem

As described above, with the advent of the DAS, a method of transmitting and receiving a synchronization signal between a base station and a mobile station in the DAS has been required.

An object of the present invention is to provide a method and apparatus of efficiently transmitting and receiving a synchronization signal in a wireless communication system that uses distributed antennas.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

Solution to Problem

To achieve these objects and other advantages and in accordance with the purpose of the invention, as embodied and broadly described herein, a method of receiving a synchronization signal in a mobile station of a distributed antenna system (DAS) comprises receiving a primary preamble from a base station through one of a plurality of distributed antennas, which is previously defined; and acquiring first synchronization using the primary preamble.

In this case, the mobile station receives first secondary preambles from the base station through two or more of the plurality of distributed antennas, and selects the antenna, which has transmitted a secondary preamble having the strongest signal intensity among the first secondary preambles, as a target antenna for acquisition of second synchronization, and acquires the second synchronization using the secondary preamble transmitted through the target antenna.

Also, the first secondary preambles may be different codes from one another.

Also, the first secondary preambles may be the same codes cyclic-shifted by different cyclic shift values.

Also, the first secondary preambles may be transmitted at different times.

Also, the first synchronization is that for the antenna which is previously defined, and the second synchronization is that for the target antenna.

Also, the mobile station may change the target antenna using the first secondary preambles.

Also, the mobile station further receives second secondary preambles from the base station through two or more of the plurality of distributed antennas, and changes the target antenna using the second secondary preambles.

In another aspect of the present invention, a method of transmitting a synchronization signal from a base station of a distributed antenna system (DAS) comprises generating a primary preamble; and transmitting the primary preamble through one of a plurality of distributed antennas, which is previously defined.

In still another aspect of the present invention, a mobile station of a distributed antenna system (DAS) comprises a receiving module receiving a primary preamble from a base station through one of a plurality of distributed antennas, which is previously defined; and a processor acquiring first synchronization using the primary preamble.

In further still another aspect of the present invention, a base station of a distributed antenna system (DAS) comprises a processor generating a primary preamble; and a transmitting module transmitting the primary preamble through one of a plurality of distributed antennas, which is previously defined.

Advantageous Effects of Invention

According to the embodiments of the present invention, if a plurality of distributed antennas are located within a cell, the mobile station can acquire downlink synchronization and efficiently perform selection and switching of a target antenna.

It is to be understood that the advantages that can be obtained by the present invention are not limited to the aforementioned advantages and other advantages which are not mentioned will be apparent from the following description to the person with an ordinary skill in the art to which the present invention pertains.

BRIEF DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE FOR CARRYING OUT THE INVENTION

Hereinafter, the preferred embodiments of the present invention will be described with reference to the accompanying drawings. It is to be understood that the detailed description, which will be disclosed along with the accompanying drawings, is intended to describe the exemplary embodiments of the present invention, and is not intended to describe a unique embodiment with which the present invention can be carried out. Hereinafter, the following detailed description includes detailed matters to provide full understanding of the present invention. However, it will be apparent to those skilled in the art that the present invention can be carried out without the detailed matters. For example, although the following description will be made based on that a mobile communication system is an institute electrical and electronics engineers (IEEE) 802.16 system, the following description can be applied to another random mobile communication system, such as a 3rd generation partnership project (3GPP) long term evolution (LTE) system excluding particular features of the IEEE 802.16 system.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

Moreover, in the following description, it is assumed that a mobile station will refer to a user equipment (UE), or a mobile or fixed type user terminal device. Also, it is assumed that a base station will refer to a random node of a network terminal that performs communication with a mobile station, such as Node B (NB) and eNode B (eNB).

The present invention relates to a method of transmitting and receiving a synchronization signal (for example, preamble) for downlink synchronization when a plurality of distributed antennas exist within a specific cell. In the embodiment of the present invention, it is assumed that a specific number of distributed antennas (for example, three, six, and seven) exist per cell, and the same signal is transmitted from all the distributed antennas. However, it is to be understood that the number and location of distributed antennas within a cell and a method of configuring and using the distributed antennas are only exemplary, and various modifications can be made in the present invention.

Figure 1:
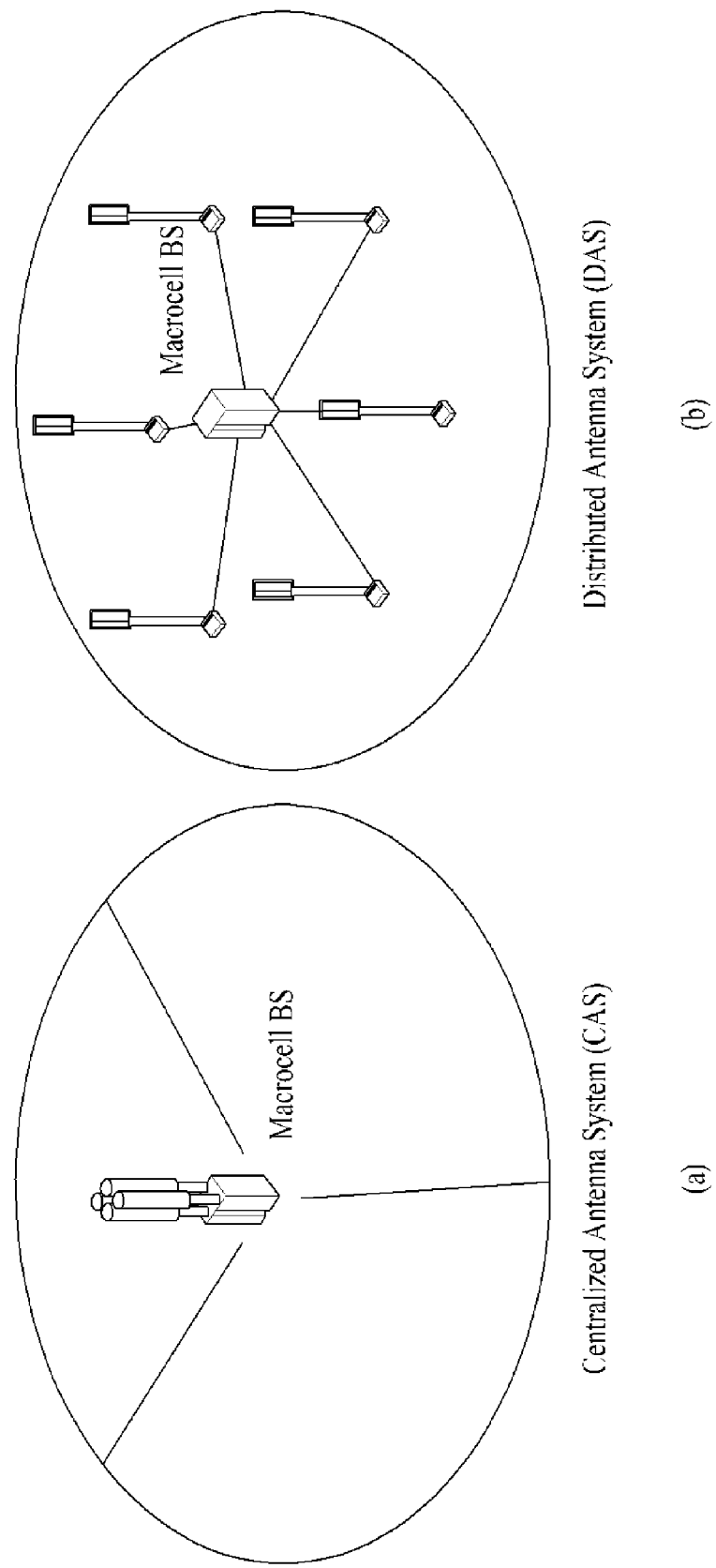
FIG. 1 is a diagram illustrating comparison between a centralized antenna system (CAS) and a DAS.
Figure 2:
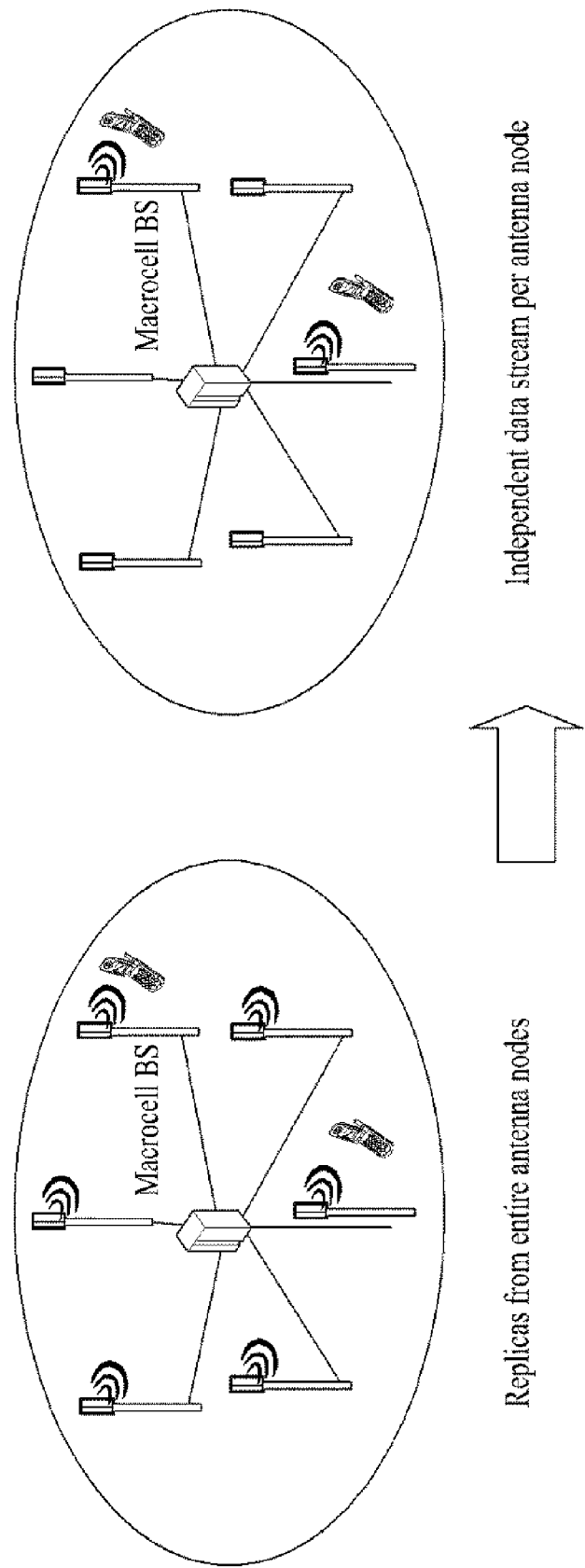
FIG. 2 is a diagram illustrating an example of a method of using and configuring a DAS.
Figure 3:
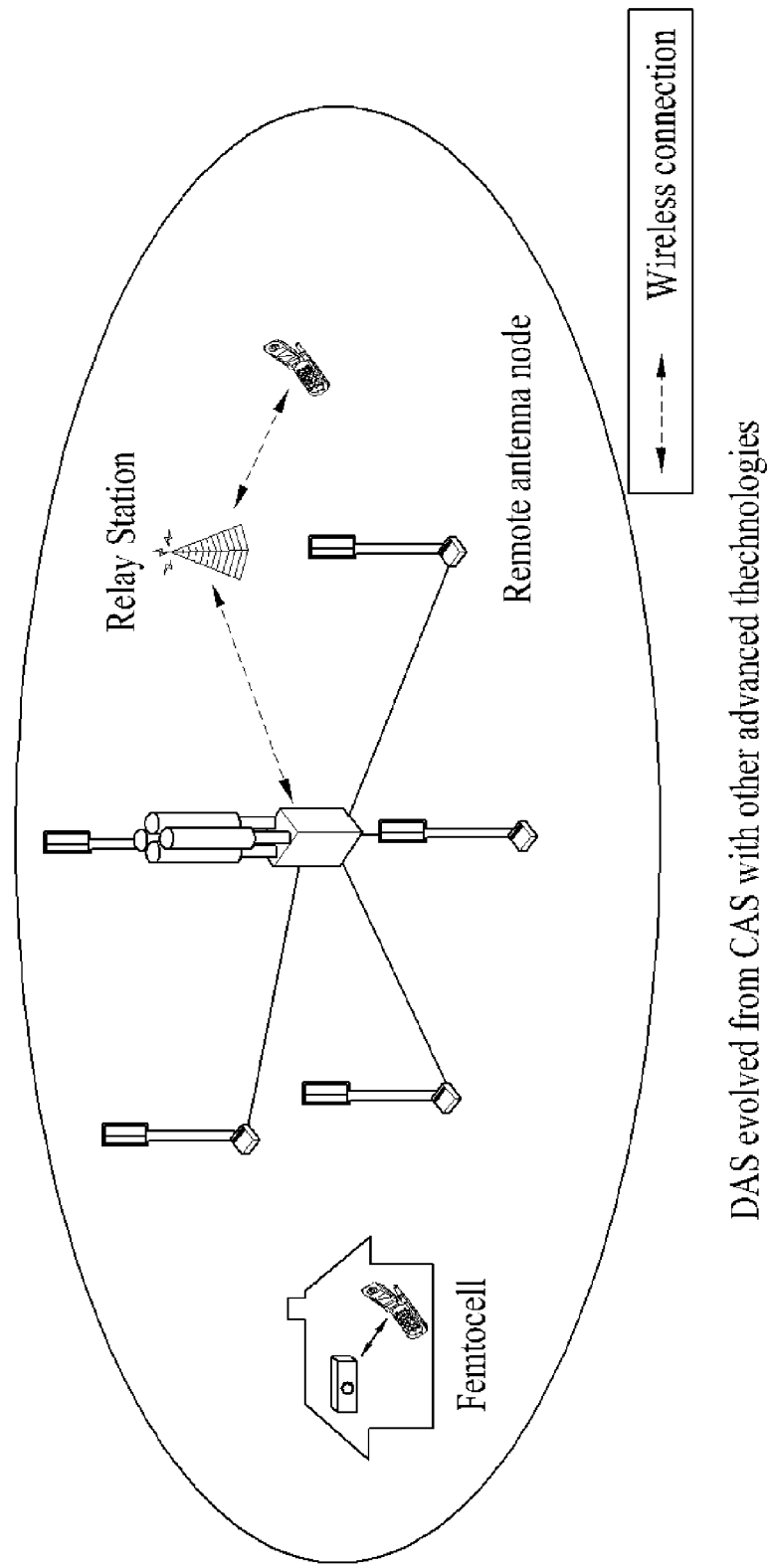
FIG. 3 is a diagram illustrating an example of configuring a DAS from a CAS having a relay and a femto cell.
Figure 4:
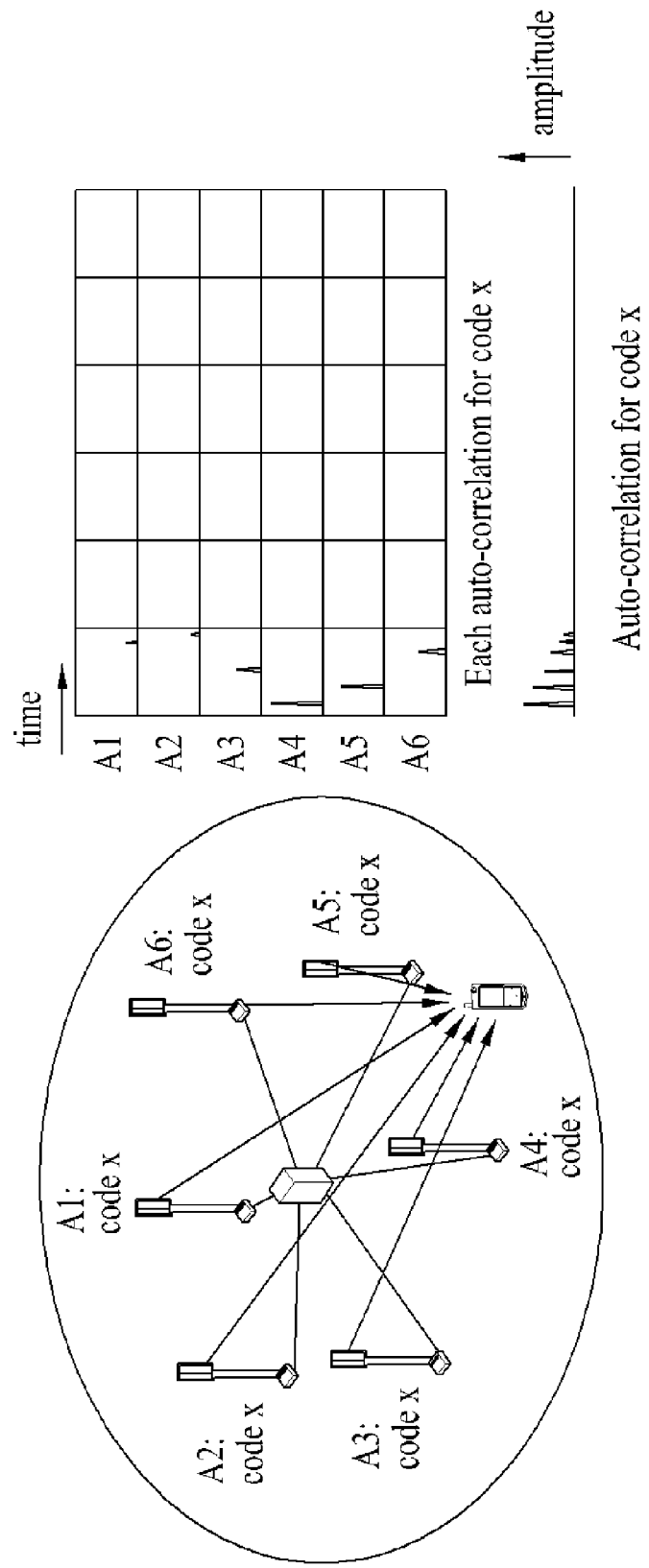
FIG. 4 is a diagram illustrating that a plurality of distributed antennas transmit one code as a preamble for downlink synchronization.

First of all, a case where a plurality of distributed antennas transmit one code as a preamble for downlink synchronization will be described with reference to FIG. 4. FIG. 4 is a diagram illustrating that a plurality of distributed antennas transmit one code as a preamble for downlink synchronization.

In FIG. 4, the plurality of distributed antennas within a cell transmit the same preamble code x at the same time and frequency location.

If the plurality of distributed antennas transmit the same code as illustrated in FIG. 4, the mobile station receives receiving signals from each of the plurality of antennas at different propagation delays depending on its location like auto-correlation illustrated in FIG. 4. Although FIG. 4 illustrates amplitude of auto-correlation by considering propagation loss based on distance, the amplitude of auto-correlation may actually be affected by shadowing. Also, although each auto-correlation for code x is illustrated per distributed antenna at a right upper side in FIG. 4, auto-correlation for code x is actually illustrated at a right lower side in FIG. 4 in such a manner that auto-correlation values from A1 to A6 are associated with one another.

If time-delayed signals are simultaneously received from the plurality of distributed antennas like auto-correlation in FIG. 4, auto-correlation values of the signals reach a plurality of peaks. Even if path loss or propagation loss is only considered and an idle state is only considered, since the peaks may be changed with one another due to cross-correlation values, a problem occurs in detection of a preamble. At this time, the idle state means that it is not affected by noise, fading, Doppler, etc., and the cross-correlation means correlation for different codes at the idle state. In case of no idle state, the cross-correlation may mean correlation of the other portions except for the periphery and location of the original peak in auto-correlation.

Also, even if the mobile station initially performs normal synchronization, an error may occur in synchronization due to the aforementioned problem when the synchronization is updated. Accordingly, the present invention suggests a method of transmitting and receiving a synchronization signal to solve the aforementioned problem.

Next, a method of transmitting and receiving a synchronization signal according to the first embodiment of the present invention will be described with reference to FIG. 5.

In the first embodiment of the present invention, if a plurality of distributed antennas exist within a cell, each of the plurality of distributed antennas transmits different codes as synchronization signals for downlink synchronization. FIG. 5 is a diagram illustrating that a plurality of distributed antennas transmit their respective code as a preamble for downlink synchronization.

Figure 5:
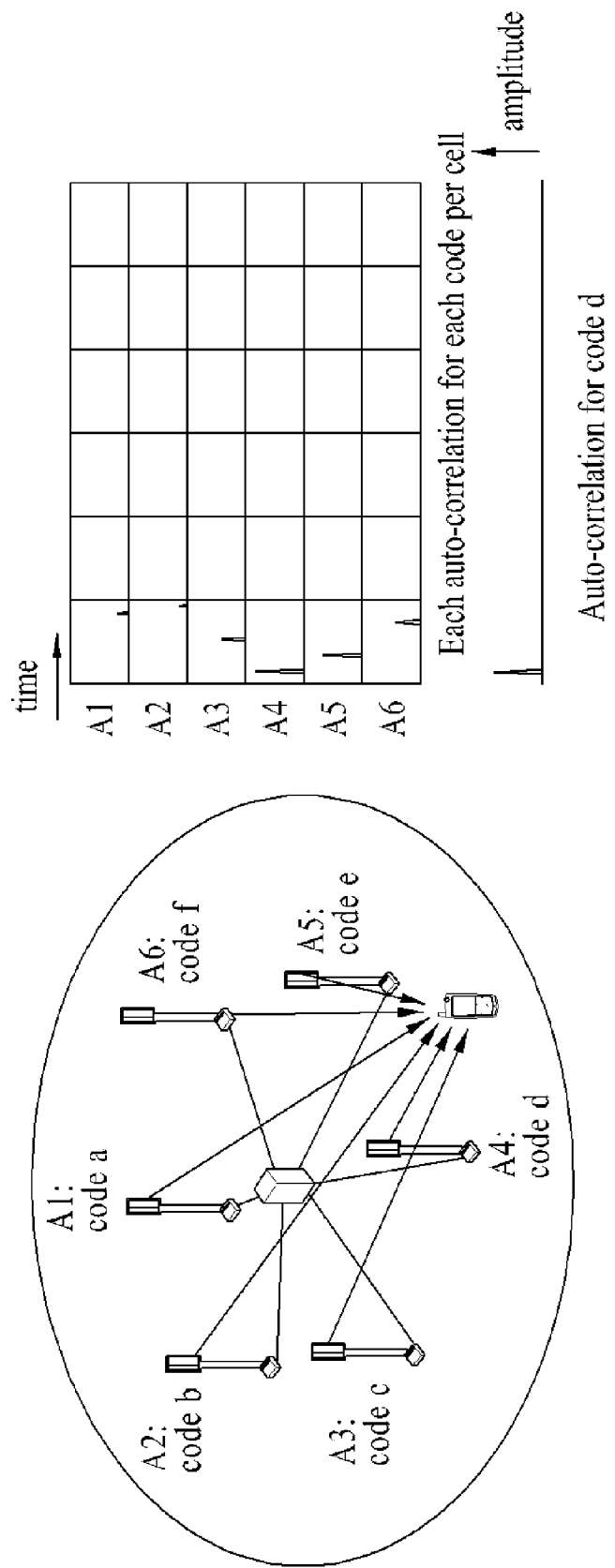
FIG. 5 is a diagram illustrating that a plurality of distributed antennas transmit their respective code as a preamble for downlink synchronization.

In the same manner as each auto-correlation for each code per cell illustrated at a right upper side of FIG. 5, the mobile station receives signals with different propagation delays from each of the plurality of antennas depending on its location. However, auto-correlation values from each code are not added to one another by auto-correlation but cross-correlated. In other words, only one peak value occurs like auto-correlation for code d illustrated at a right lower side of FIG. 5.

Accordingly, the mobile stations can acquire downlink synchronization without ambiguity by using different codes per antenna. In this case, the different codes can mean that at least one of code index, segment index and carrier index is different from the other indexes. For example, in case of Zadoff-Chu sequence, the different codes may mean different physical root indexes. In other words, in the following Equation 1, r means the different codes.

[Equation 1]

$$x_r(k) = \begin{cases} \exp\left(\frac{-j2\pi r}{N_{zc}}\left(\frac{k^2}{2} + qk\right)\right), & k = 0, 1, \ldots, N_{zc} - 1 \text{ if } N_{zc} \text{ is even.} \\ \exp\left(\frac{-j2\pi r}{N_{zc}}\left(\frac{k(k+1)}{2} + qk\right)\right), & k = 0, 1, \ldots, N_{zc} - 1 \text{ if } N_{zc} \text{ is odd.} \end{cases}$$

In this case, $N_{ZC}$ represents a length of Zadoff-Chu sequence, and q may be a random natural number. When q is 0, Zadoff-Chu sequence having an odd length can be expressed by the following Equation 2.

$$x_r(k) = \exp\left(-j\frac{\pi r k(k+1)}{N_{zc}}\right), k = 0, 1, \ldots, N_{zc} - 1 \quad \text{[Equation 2]}$$

In this case, when $N_{ZC}$ is a prime number, the root index r can use all natural numbers from 1 to $N_{ZC}-1$ without deterioration of sequence features (for example, auto-correlation, cross-correlation, etc.).

If a primary antenna having the strongest receiving power in the mobile station is changed due to location movement of the mobile station, etc., the mobile station may perform a procedure such as handover between antennas.

If each of the plurality of antennas transmits its own code different from the codes of the other antennas as a synchronization signal for downlink synchronization, an example of a procedure of transmitting and receiving a primary preamble and a secondary preamble between a base station and a mobile station will be described.

The base station transmits different codes from the respective distributed antennas within the cell as primary preambles. And, the base station transmits different codes from the respective distributed antennas as secondary preambles.

The mobile station in the cell acquires a large scaled timing by using a repeated pattern in a time domain of the primary preamble. In this case, the large scaled timing means timing synchronization having an error smaller than that of one OFDMA (or SC-FDMA) symbol duration.

The mobile station, which has acquired the large scaled timing synchronization, proceeds to a step of detecting the secondary preamble by controlling more exact timing during the step of detecting the primary preamble code or without timing control.

The mobile station acquires more exact synchronization by detecting the secondary preamble through the synchronization acquired using the primary preamble. At this time, the synchronization acquired by the primary preamble and the secondary preamble means synchronization for a target antenna (T-Ant). An example of the target antenna may include an antenna having the best receiving power in the mobile station or an antenna having the best channel.

Afterwards, the mobile station may change the target antenna by using the secondary preamble within the cell.

In the same manner as the first embodiment of the present invention, if different codes are used as the synchronization signals by the plurality of distributed antennas within the cell, a reuse factor of the preamble or a cell ID associated with the preamble is reduced. Accordingly, different scrambling codes or covering codes are applied to the same source code (or physical root index), or operation, multiplication or addition of different scrambling codes or covering codes is performed for the same source code, whereby the resultant codes can be used for each of the distributed antennas as different codes. In other words, the different scrambling codes or covering codes are applied to the distributed antennas, whereby the signals received from the respective distributed antennas are generated in the form of FIG. 5 during the detection process. In this way, the scrambling codes or covering codes are applied as above, whereby the problem that the reuse factor of the cell ID is reduced can be solved.

Hereinafter, a method of transmitting and receiving a synchronization signal in a wireless communication system that uses distributed antenna without reducing a reuse factor of a preamble or a cell ID associated with the preamble will be suggested.

Figure 6:
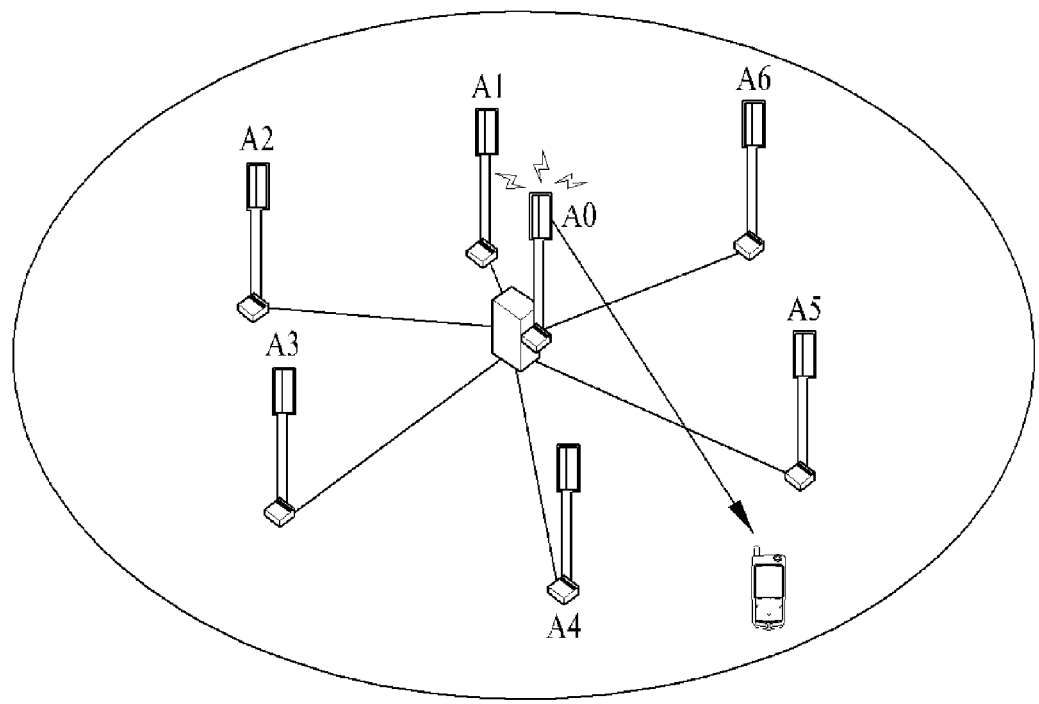
FIG. 6 is a diagram illustrating an example of a method of transmitting and receiving a synchronization signal in accordance with the second embodiment of the present invention.
Figure 7:
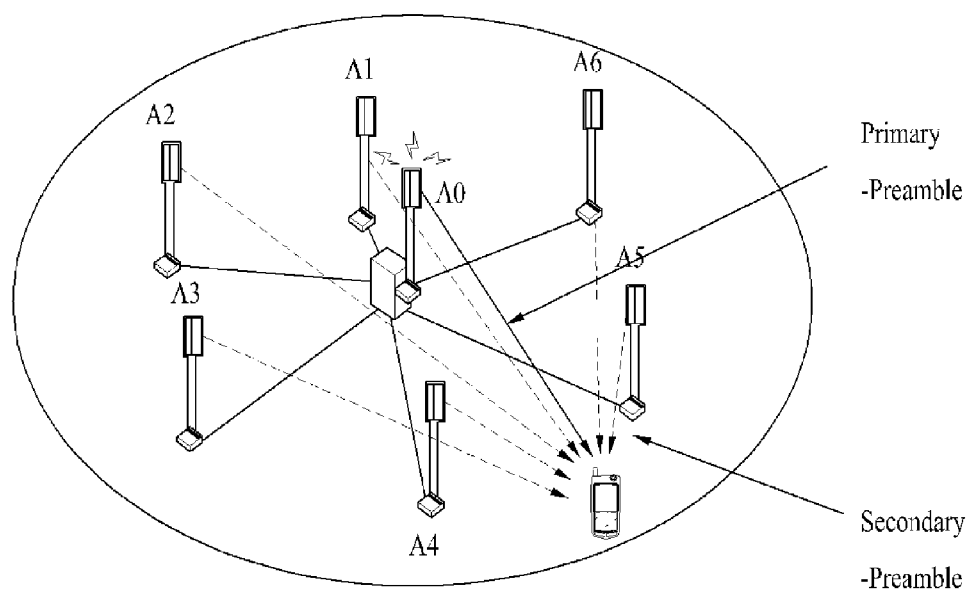
FIG. 7 is a diagram illustrating another example of a method of transmitting and receiving a synchronization signal in accordance with the second embodiment of the present invention.

Next, a method of transmitting and receiving a synchronization signal according to the second embodiment of the present invention will be described with reference to FIG. 6 and FIG. 7. FIG. 6 is a diagram illustrating that an example of a method of transmitting and receiving a synchronization signal according to the second embodiment of the present invention. FIG. 7 is a diagram illustrating that another example of a method of transmitting and receiving a synchronization signal according to the second embodiment of the present invention.

Even if the plurality of distributed antennas exist within a cell, the synchronization signal for downlink synchronization can be transmitted from only one antenna (P-Ant) which is previously defined.

Although seven antennas exist within the cell in FIG. 6, a preamble for downlink synchronization is transmitted from only one antenna located at the center of the cell, wherein the antenna is previously defined. Accordingly, the antennas do not affect the reuse factor of the preamble. The mobile station acquires downlink synchronization by using the preamble transmitted from a specific antenna.

Afterwards, the mobile station can acquire more exact synchronization for target antennas of the plurality of antennas within the cell, wherein the target antennas have the best efficiency, the strongest receiving power or the best channel status. At this time, the target antennas may transmit additional signal for synchronization. An example of the additional signal may include a preamble (for example, secondary preamble) or midamble, which has code, time and structure different from those of the signal transmitted from the P-Ant. The additional signal may be designed for the target antennas, or the conventional midamble, reference signal, or pilot may be used as the additional signal without specific design and mention.

An example of transmitting and receiving a primary preamble and a secondary preamble between a base station and a mobile station in accordance with the second embodiment of the present invention will be described.

Referring to FIG. 6, the base station transmits the primary preamble from one of a plurality of distributed antennas within a cell, which is previously defined. And, the base station transmits the secondary preamble from one of the plurality of distributed antennas within the cell, which is previously defined. In this case, although a transmitting antenna of the primary preamble may be different from that of the secondary preamble, the same transmitting antenna may be used for the primary preamble and the secondary preamble.

The mobile station in the cell acquires a large scaled timing by using a repeated pattern in a time domain of the primary preamble. In this case, the large scaled timing means timing synchronization having an error smaller than that of one OFDMA (or SC-FDMA) symbol duration.

The mobile station, which has acquired the large scaled timing synchronization, proceeds to a step of detecting the secondary preamble by controlling more exact timing during the step of detecting the primary preamble code or without timing control.

The mobile station acquires more exact synchronization by detecting the secondary preamble through the synchronization acquired using the primary preamble. At this time, the synchronization acquired by the primary preamble and the secondary preamble means synchronization for the cell.

The mobile station additionally acquires synchronization for a target antenna (T-Ant) after acquiring cell synchronization using the primary preamble and the secondary preamble. Acquisition of synchronization for the target antenna and/or selection of the target antenna can be performed using a channel (for example, midamble, or new specific channel for acquisition or synchronization or selection of the target antenna) in addition to the preamble. Also, acquisition of synchronization for the target antenna and/or selection of the target antenna may be performed by conventional basic channels (for example, reference signal, pilot, and sounding signal) without the new specific channel. In other words, the mobile station performs acquisition of synchronization for the target antenna and/or selection of the target antenna after acquiring synchronization (synchronization for P-Ant) for the large scaled cell through the primary preamble.

Afterwards, the mobile station may change the target antenna by using the specific channel or the basic channels within the cell.

Another example of transmitting and receiving a primary preamble and a secondary preamble between a base station and a mobile station in accordance with the second embodiment of the present invention will be described.

As illustrated in FIG. 7, the base station transmits the primary preamble from one (P-Ant) of a plurality of distributed antennas within a cell, which is previously defined. And, the base station transmits the secondary preamble from each of the plurality of distributed antennas within the cell. Alternatively, the base station may transmit the secondary preamble from two or more of the plurality of distributed antennas. In this case, the secondary preambles transmitted from each of the distributed antennas or two or more antennas may be the same code.

Power control for transmission of the secondary preamble from each of the distributed antennas can be applied. For example, since the secondary preamble within cell coverage is transmitted through the plurality of antennas, proper transmission power can be set considering coverage of each of the plurality of antennas. Although not illustrated in FIG. 7, the secondary preamble may be transmitted from the P-Ant. Also, the present invention is not restricted by a method of transmitting a secondary preamble using cyclic shift or time offset.

The mobile station in the cell acquires a large scaled timing by using a repeated pattern in a time domain of the primary preamble. In this case, the large scaled timing means timing synchronization having an error smaller than that of one OFDMA (or SC-FDMA) symbol duration.

The mobile station, which has acquired the large scaled timing synchronization, proceeds to a step of detecting the secondary preamble by controlling more exact timing during the step of detecting the primary preamble code or without timing control.

The mobile station acquires more exact synchronization by detecting the secondary preamble through the synchronization acquired using the primary preamble. At this time, the synchronization acquired by the primary preamble means synchronization for one antenna, which is previously defined, and the synchronization acquired by the secondary preamble means synchronization for the target antenna. In other words, after acquiring the synchronization (synchronization for P-Ant) for the large scaled cell through the primary preamble, the mobile station acquires exact synchronization for the T-Ant through the secondary preamble.

Afterwards, the mobile station may change the target antenna by using the secondary preamble within the cell. At this time, the mobile station may change the target antenna by using the secondary preambles, which are previously received, or may change the target antenna by additionally receiving the secondary preambles.

Still another example of transmitting and receiving a primary preamble and a secondary preamble between a base station and a mobile station in accordance with the second embodiment of the present invention will be described.

As illustrated in FIG. 7, the base station transmits the primary preamble from one (P-Ant) of a plurality of distributed antennas within a cell, which is previously defined. And, the base station transmits the secondary preamble from each of the plurality of distributed antennas within the cell. Alternatively, the base station may transmit the secondary preamble from two or more of the plurality of distributed antennas. In this case, the secondary preambles transmitted from each of the distributed antennas or two or more antennas may be different codes. The different codes may be codes having different physical root indexes, or may be codes having the same physical root code but having different scrambling codes, covering codes or cyclic shift codes.

Power control for transmission of the secondary preamble from each of the distributed antennas can be applied. For example, since the secondary preamble within cell coverage is transmitted through the plurality of antennas, proper transmission power can be set considering coverage of each of the plurality of antennas. Although not illustrated in FIG. 7, the secondary preamble may be transmitted from the P-Ant. Also, the present invention is not restricted by a method of transmitting a secondary preamble using cyclic shift or time offset.

The mobile station in the cell acquires a large scaled timing by using a repeated pattern in a time domain of the primary preamble. In this case, the large scaled timing means timing synchronization having an error smaller than that of one OFDMA (or SC-FDMA) symbol duration.

The mobile station, which has acquired the large scaled timing synchronization, proceeds to a step of detecting the secondary preamble by controlling more exact timing during the step of detecting the primary preamble code or without timing control.

The mobile station acquires more exact synchronization by detecting the secondary preamble through the synchronization acquired using the primary preamble. At this time, the synchronization acquired by the primary preamble means synchronization for one antenna, which is previously defined, and the synchronization acquired by the secondary preamble means synchronization for the target antenna. In other words, after acquiring the synchronization (synchronization for P-Ant) for the large scaled cell through the primary preamble, the mobile station acquires exact synchronization for the T-Ant through the secondary preamble.

The mobile station can select the antenna, which has transmitted the secondary preamble having the strongest signal intensity, as a target base station, and can acquire synchronization for the target antenna by using the secondary preamble transmitted through the target base station.

Afterwards, the mobile station may change the target antenna by using the secondary preamble within the cell. At this time, the mobile station may change the target antenna by using the secondary preambles, which are previously received, or may change the target antenna by additionally receiving the secondary preambles.

Figure 8:
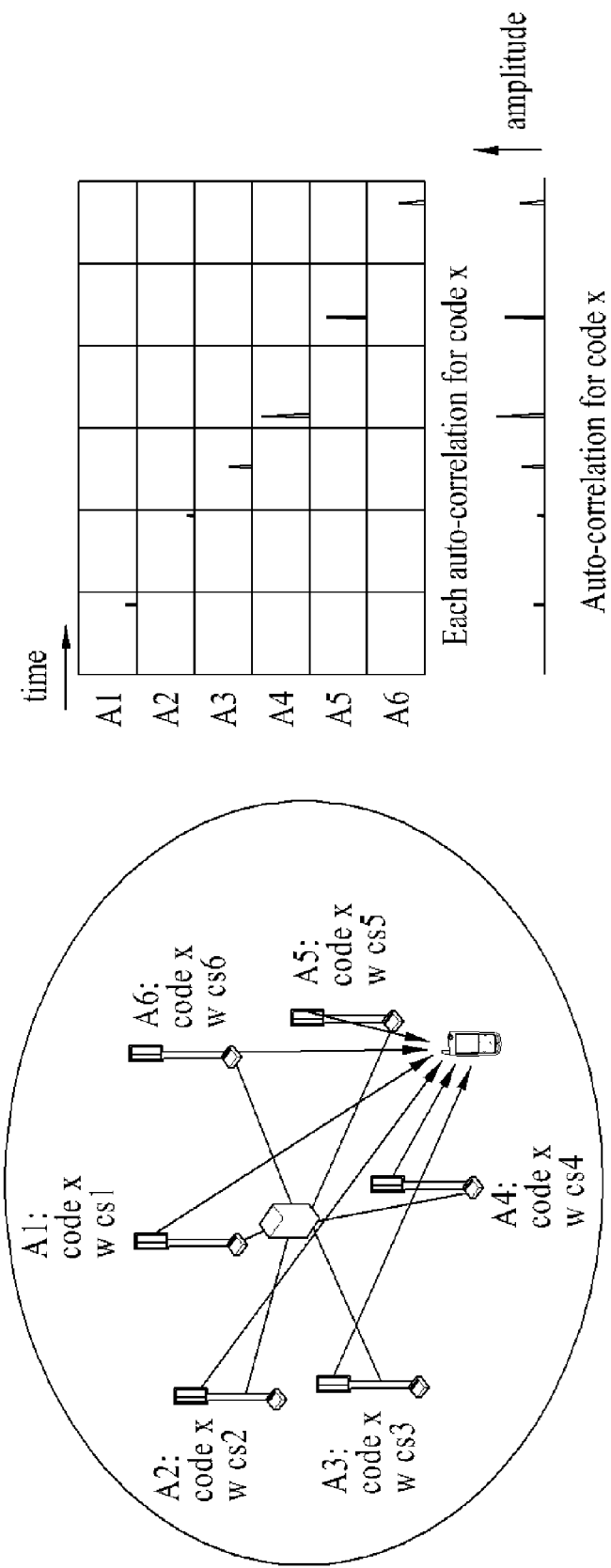
FIG. 8 is a diagram illustrating an example of a method of transmitting and receiving a synchronization signal in accordance with the third embodiment of the present invention.

Next, a method of transmitting and receiving a synchronization signal according to the third embodiment of the present invention will be described with reference to FIG. 8. FIG. 8 is a diagram illustrating that an example of a method of transmitting and receiving a synchronization signal according to the third embodiment of the present invention.

In the third embodiment of the present invention, if a plurality of distributed antennas exist within a cell, each of the plurality of distributed antennas transmits the same code having different cyclic shift values as synchronization signals for downlink synchronization.

In FIG. 8, preambles for downlink synchronization, which are transmitted from the plurality of distributed antennas within the cell, have the same root code (code x) and different cyclic shift values. In this case, the root code means a code having good correlation without application of time domain cyclic shift. For example, the root codes mean codes having different physical root indexes r in Zadoff-Chu sequence. In FIG. 8, six different cyclic shift values are illustrated.

Although each auto-correlation for code x is illustrated per transmitting antenna at a right upper side of FIG. 8, auto-correlation for code x is actually illustrated at a right lower side of FIG. 8 in such a manner that auto-correlation values from A1 to A6 are associated with one another. At this time, although peak values of auto-correlation from the plurality of transmitting antennas are located near one another in FIG. 4, they are arranged at wide intervals in FIG. 8.

In this case, cyclic shift means that in the time domain. Cyclic shift may be performed for a time domain signal or code in OFDMA or SC-FDMA. Also, in case of OFDMA, cyclic shift may be performed for a frequency domain code or signal by multiplication of exponential terms to be equivalent to time domain cyclic shift using fourier transform.

Accordingly, different cyclic shifts are applied to the synchronization signals transmitted from each of the plurality of distributed antennas for the same code (same physical root index). In this case, the same code may mean code index, segment index and carrier index are the same as one another.

For example, different physical root indexes r are applied to Zadoff-Chu sequence.

If the method of FIG. 8 is used, when time-delayed signals are simultaneously received from the plurality of distributed antennas like FIG. 4, auto-correlation values of the signals reach a plurality of peaks. Even if path loss or propagation loss is only considered and an idle state is only considered, since the peaks may be changed with one another due to cross-correlation values, a problem occurs in detection of a preamble.

However, a plurality of preambles or accumulated detection results can be used to prevent performance deterioration caused by change of the peaks from occurring. The advantage of the method of FIG. 8 occurs in the update process of synchronization. The correlation peaks of the respective antennas occur randomly in the method of FIG. 4, whereas the correlation peaks of the respective antennas occur in their respective domains (each cyclic shift domain) in the method of FIG. 8 as the base station transmits the cyclic-shifted code. Accordingly, if the mobile station performs synchronization within a specific cyclic shift domain, it can update the synchronization without ambiguity in such a manner that location change of the peaks within the cyclic shift domain is observed. Also, the mobile station may change the corresponding antenna to the target antenna through relative comparison between the specific cyclic shift duration synchronized by itself and change of the peaks.

If the primary antenna (antenna having the strongest receiving power in the mobile station) is changed due to location movement of the mobile station, etc., the mobile station may perform a procedure such as handover between antennas.

If the respective distributed antennas transmit different cyclic-shifted codes as illustrated in FIG. 8, each mobile station should know information of the antennas. In other words, each mobile station should perform synchronization by reflecting the cyclic-shifted value in a specific antenna from the peak location without simply performing synchronization at the peak location of auto-correlation. Accordingly, the method of FIG. 8 is applied to the step of maintaining and updating synchronization more preferably than the step of performing initial synchronization.

If the respective distributed antennas transmit different cyclic-shifted codes as illustrated in FIG. 8, the mobile station may apply the method by changing the existing preamble, or may apply the method by generating a separate channel for updating downlink synchronization and/or selecting a target antenna separately from the preamble after performing initial synchronization using the existing preamble. Also, the mobile station may apply the method to the midamble after performing initial synchronization using the existing preamble, whereby the midamble may be used to update downlink synchronization and/or select the target antenna.

An example of a procedure of transmitting and receiving a primary preamble and a secondary preamble between a base station and a mobile station in accordance with the third embodiment of the present invention will be described.

The base station transmits the primary preamble and the secondary preamble.

At this time, application of the method according to the third embodiment is not restricted by code classification of the respective preambles and the antennas (specific antenna or all distributed antennas) through which the preambles are transmitted. In other words, the methods according to the aforementioned first and second embodiments and the method according to the fourth embodiment, which will be described later, can be used.

The mobile station in the cell acquires initial timing synchronization by using the primary preamble and/or the secondary preamble.

The mobile station in the cell receives a specific channel to synchronize with the target antenna and/or select the target antenna after acquiring initial timing synchronization. In this case, the specific channel means a channel through which a code for applying different cyclic shifts to the same physical root index between the distributed antennas is transmitted as illustrated in FIG. 8. For example, cyclic shift between the distributed antennas may be applied to the midamble. In other words, the mobile station acquires exact synchronization for the target antenna and/or selects the target antenna by using the specific channel after acquiring the synchronization for the cell through the preamble.

Afterwards, the mobile station may change the target antenna by using the specific channel within the cell.

Another example of a procedure of transmitting and receiving a primary preamble and a secondary preamble between a base station and a mobile station in accordance with the third embodiment of the present invention will be described.

The base station transmits the primary preamble from one (P-Ant) of a plurality of distributed antennas within the cell, which is previously defined. And, the base station transmits the secondary preamble from each of the plurality of distributed antennas within the cell. In this case, the secondary preambles transmitted from each of the distributed antennas are the same codes cyclic-shifted at different cyclic shift values. Namely, the secondary preambles transmitted from each of the distributed antennas may have the same physical root index but may have different cyclic shift values.

Power control for transmission of the secondary preamble from each of the distributed antennas can be applied. For example, since the secondary preamble within cell coverage is transmitted through the plurality of antennas, proper transmission power can be set considering coverage of each of the plurality of antennas. Although not illustrated in FIG. 8, the secondary preamble may be transmitted from the P-Ant. Also, the present invention is not restricted by a method of transmitting a secondary preamble using cyclic shift or time offset.

The mobile station in the cell acquires a large scaled timing by using a repeated pattern in a time domain of the primary preamble. In this case, the large scaled timing means timing synchronization having an error smaller than that of one OFDMA (or SC-FDMA) symbol duration.

The mobile station, which has acquired the large scaled timing synchronization, proceeds to a step of detecting the secondary preamble by controlling more exact timing during the step of detecting the primary preamble code or without timing control.

The mobile station acquires more exact synchronization by detecting the secondary preamble through the synchronization acquired using the primary preamble. At this time, the synchronization acquired by the primary preamble means synchronization for one antenna, which is previously defined, and the synchronization acquired by the secondary preamble means synchronization for the target antenna. In other words, after acquiring the synchronization (synchronization for P-Ant) for the large scaled cell through the primary preamble, the mobile station acquires exact synchronization for the target antenna through the secondary preamble.

The mobile station can select the antenna, which has transmitted the secondary preamble having the strongest signal intensity, as a target base station, and can acquire synchronization for the target antenna by using the secondary preamble transmitted through the target base station.

Afterwards, the mobile station may change the target antenna by using the secondary preamble within the cell.

In the third embodiment of the present invention, the cyclic shift value applied to the distributed antennas may previously be fixed, or may be configured depending on the status. If the cyclic shift value is previously fixed, different cyclic shift values may be defined depending on the number of distributed antennas within the cell. For example, cyclic shift (CS) may be defined as 'useful symbol duration (Tb)/the number of distributed antennas per cell'.

Unlike the above, the cyclic shift value may be configured depending on the size of the cell. Hereinafter, cyclic shift based on the size of the cell will be described.

In the third embodiment of the present invention, the cyclic shift value applied to the distributed antennas has the maximized effect when the cyclic shift domain is divided as illustrated in the correlation diagram of FIG. 8. However, propagation delay occurring in the downlink becomes greater as the size of the cell becomes greater. In other words, although the cyclic shift domain can be divided in the small cell as illustrated in the correlation diagram of FIG. 8, propagation delay becomes greater than cyclic shift in the large cell, whereby the peaks from the respective antennas go over the cyclic shift domain and as a result, the cyclic shift domain may not be divided. Propagation delay transmitted from the downlink transmitting antennas to the mobile station may be referred to as one-way trip delay (OTD) and may be considered by velocity of light. In the following example, the possible maximum cell size of the OTD is represented by the time duration divided by cyclic shift based on the number (Mn) of cyclic shifts per code. In this case, round trip delay (RTD) represents that it considers propagation delay of the downlink and that of the uplink at the same time.

For example, in the IEEE P802.16m, supposing that a sampling time is 44.6429 ns at a sampling frequency of 22.4000 MHz, an OFDMA CP length is 11.4286 us, a useful symbol duration (Tb) is 91.4286 us, and an OFDMA symbol duration (Ts) is 102.8571 us, the time domain length (CS) divided by cyclic shift based on how many cyclic shift codes (Mn) are used within the useful symbol duration, and the distance of RTD and OTD, which can be supported by the time domain length (CS), are as follows.

Mn=1 CS=91.428571 [us] RTD=13.713371 [km] OTD=27.426743 [km]

Mn=2 CS=45.714286 [us] RTD=6.856686 [km] OTD=13.713371 [km]

Mn=3 CS=30.476190 [us] RTD=4.571124 [km] OTD=9.142248 [km]

Mn=4   CS=22.857143   [us]   RTD=3.428343   [km]   OTD=6.856686 [km]
Mn=5   CS=18.285714   [us]   RTD=2.742674   [km]   OTD=5.485349 [km]
Mn=6   CS=15.238095   [us]   RTD=2.285562   [km]   OTD=4.571124 [km]
Mn=7   CS=13.061224   [us]   RTD=1.959053   [km]   OTD=3.918106 [km]
Mn=8   CS=11.428571   [us]   RTD=1.714171   [km]   OTD=3.428343 [km]
Mn=9   CS=10.158730   [us]   RTD=1.523708   [km]   OTD=3.047416 [km]
Mn=10  CS=9.142857    [us]   RTD=1.371337   [km]   OTD=2.742674 [km]

For another example, in the 3GPP LTE, supposing that a sampling frequency is 30.7200 MHz, a sampling time is 32.5521 ns, an SC-FDMA CP length is 5.2100 us, a useful symbol duration (Tb) is 66.6667 us, and an SC-FDMA symbol duration (Ts) is 71.8767 us, the time domain length (CS) divided by cyclic shift based on how many cyclic shift codes (Mn) are used within the useful symbol duration, and the distance of RTD and OTD, which can be supported by the time domain length (CS), are as follows. In this case, RTD and OTD mean a radius of a possible maximum cell.

Mn=1   CS=66.666667   [us]   RTD=9.999333   [km]   OTD=19.998667 [km]
Mn=2   CS=33.333333   [us]   RTD=4.999667   [km]   OTD=9.999333 [km]
Mn=3   CS=22.222222   [us]   RTD=3.333111   [km]   OTD=6.666222 [km]
Mn=4   CS=16.666667   [us]   RTD=2.499833   [km]   OTD=4.999667 [km]
Mn=5   CS=13.333333   [us]   RTD=1.999867   [km]   OTD=3.999733 [km]
Mn=6   CS=11.111111   [us]   RTD=1.666556   [km]   OTD=3.333111 [km]
Mn=7   CS=9.523810    [us]   RTD=1.428476   [km]   OTD=2.856952 [km]
Mn=8   CS=8.333333    [us]   RTD=1.249917   [km]   OTD=2.499833 [km]
Mn=9   CS=7.407407    [us]   RTD=1.111037   [km]   OTD=2.222074 [km]
Mn=10  CS=6.666667    [us]   RTD=0.999933   [km]   OTD=1.999867 [km]

As will be aware of it from the above example, as Mn is increased, possible OTD is reduced. In this case, the OTD can be defined as a possible maximum distance between the distributed antennas for CS. Accordingly, although a great Mn value can be used in the small cell, a small Mn value should be used in the large cell. As a result, the cyclic shift value can be configured depending on the size (or maximum distance between the distributed antennas) of each cell. At this time, the base station should notify the mobile stations of the cyclic shift value through the broadcast channel by considering the cell size (or maximum distance between the distributed antennas). However, the base station does not need to notify the mobile stations of the actual cell size (or maximum distance between the distributed antennas), and has only to notify the mobile stations of any one value of parameter sets related to a plurality of cyclic shift values previously defined considering the cell size (or maximum distance between the distributed antennas).

Also, the cyclic shift value may be fixed as a specific one value. For example, a cyclic shift value that can support a cell having a radius of 5 km for performance optimization may be defined. For example, a value of Mn=5 may only be used in the IEEE 802.16m, and a value of Mn=4 may only be used in the 3GPP LTE.

The actual cyclic shift value may be calculated for the useful symbol duration (Tb) as above, or may be calculated by a code length (for example, Nzc). Also, in the above example, Mn is only exemplary to easily express cyclic shift, and may be a random integer not a natural number.

Figure 9:
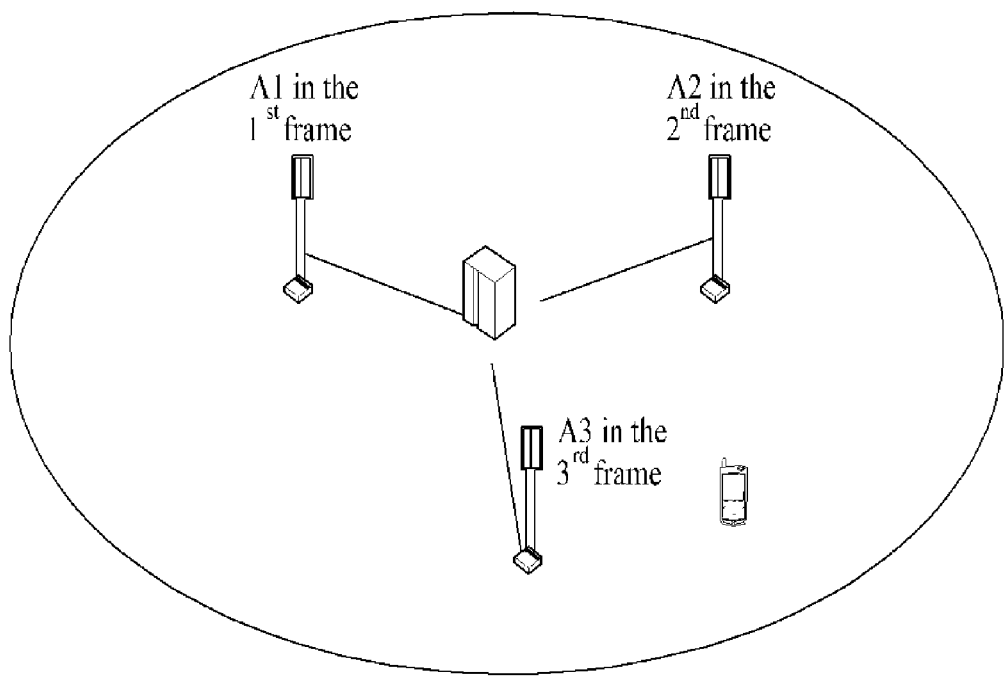
FIG. 9 is a diagram illustrating another example of a method of transmitting and receiving a synchronization signal in accordance with the first embodiment of the present invention.
Figure 10:
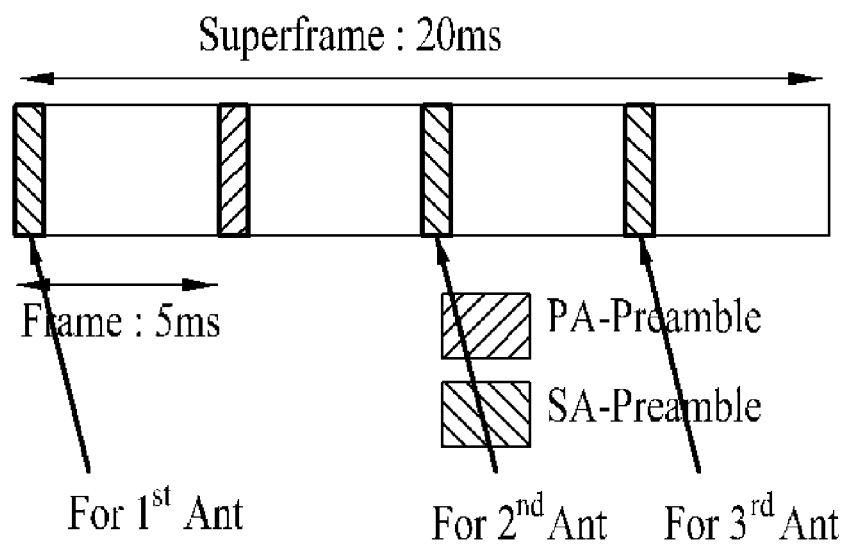
FIG. 10 is a diagram illustrating an example of time offset in an IEEE 802.16m system.

Next, a method of transmitting and receiving a synchronization signal according to the fourth embodiment of the present invention will be described with reference to FIG. 9 and FIG. 10. FIG. 9 is a diagram illustrating that an example of a method of transmitting and receiving a synchronization signal according to the fourth embodiment of the present invention.

In the fourth embodiment of the present invention, if a plurality of distributed antennas exist within a cell, the respective distributed antennas transmit their synchronization signals for downlink synchronization at different times.

In FIG. 9, the plurality of distributed antennas within the cell have the same root code (code x) as a preamble for downlink synchronization but transmit the root code at different times. For example, although these different time offsets are divided by a frame unit in FIG. 9, such time offsets may be divided by a multiple of a frame, subframe, superframe, a multiple of subframe, or a multiple of superframe. In this case, the root code means a code having good correlation without application of time domain cyclic shift. For example, the root codes mean codes having different physical root indexes r in Zadoff-Chu sequence.

In FIG. 9, since the preamble is transmitted with different time offsets, ambiguity for a plurality of correlation peaks in FIG. 4 does not occur.

An example of a procedure of transmitting and receiving a primary preamble and a secondary preamble between a base station and a mobile station in accordance with the fourth embodiment of the present invention will be described with reference to FIG. 10. FIG. 10 is a diagram illustrating an example of time offset in an IEEE 802.16m system.

Since the secondary preamble is repeatedly transmitted within a superframe in the IEEE 802.16m system, each of the repeatedly transmitted secondary preambles can be transmitted through a specific antenna. In the example of FIG. 10, three secondary preambles within the superframe are respectively transmitted through distributed antennas within a cell.

The base station transmits a primary preamble. At this time, the base station may transmit the primary preamble through one (P-Ant) of the plurality of distributed antennas within the cell, which is previously defined, or may transmit the primary preamble through all of the plurality of distributed antennas within the cell.

And, the base station transmits the secondary preamble from each of the plurality of distributed antennas with time offset. In FIG. 10, if three distributed antennas exist within the cell of the IEEE 8021.16m system, the secondary preambles within the superframe are respectively transmitted at different time offsets. In other words, the respective secondary preambles are transmitted through the plurality of distributed antennas at different times.

The mobile station in the cell acquires a large scaled timing by using a repeated pattern in a time domain of the primary preamble. In this case, the large scaled timing means timing synchronization having an error smaller than that of one OFDMA (or SC-FDMA) symbol duration.

The mobile station, which has acquired the large scaled timing synchronization, proceeds to a step of detecting the secondary preamble by controlling more exact timing during the step of detecting the primary preamble code or without timing control.

The mobile station acquires more exact synchronization by detecting the secondary preamble through the synchronization acquired using the primary preamble. At this time, the synchronization acquired by the primary preamble means synchronization for one antenna, which is previously defined, or synchronization of the large scale in common within the cell. The synchronization acquired by the secondary preamble means synchronization for the target antenna. In other words, after acquiring the synchronization (synchronization for P-Ant) for the large scaled cell through the primary preamble, the mobile station acquires exact synchronization for the target antenna through the secondary preamble.

The mobile station can select the antenna, which has transmitted the secondary preamble having the strongest signal intensity, as a target base station, and can acquire synchronization for the target antenna by using the secondary preamble transmitted through the target base station.

Afterwards, the mobile station may change the target antenna by using the secondary preamble within the cell.

Figure 11:
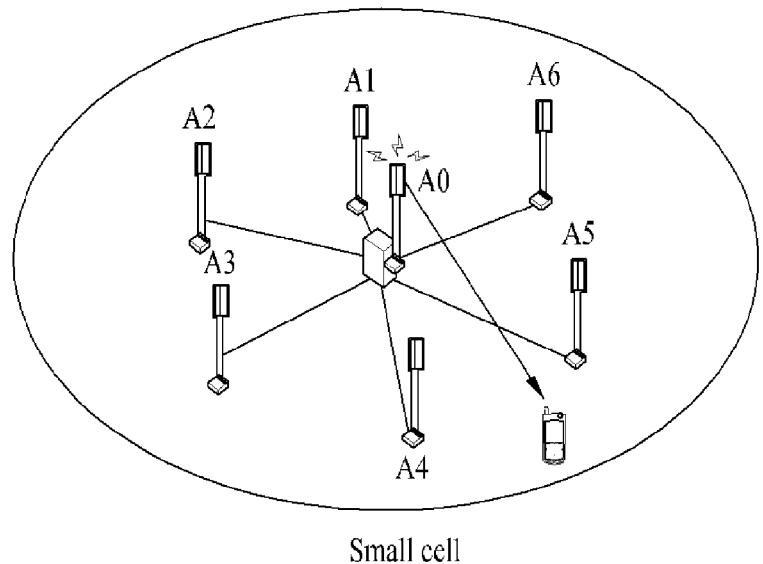
FIG. 11 is a diagram illustrating that a specific system uses a plurality of methods of transmitting a synchronization signal.
Figure 11:
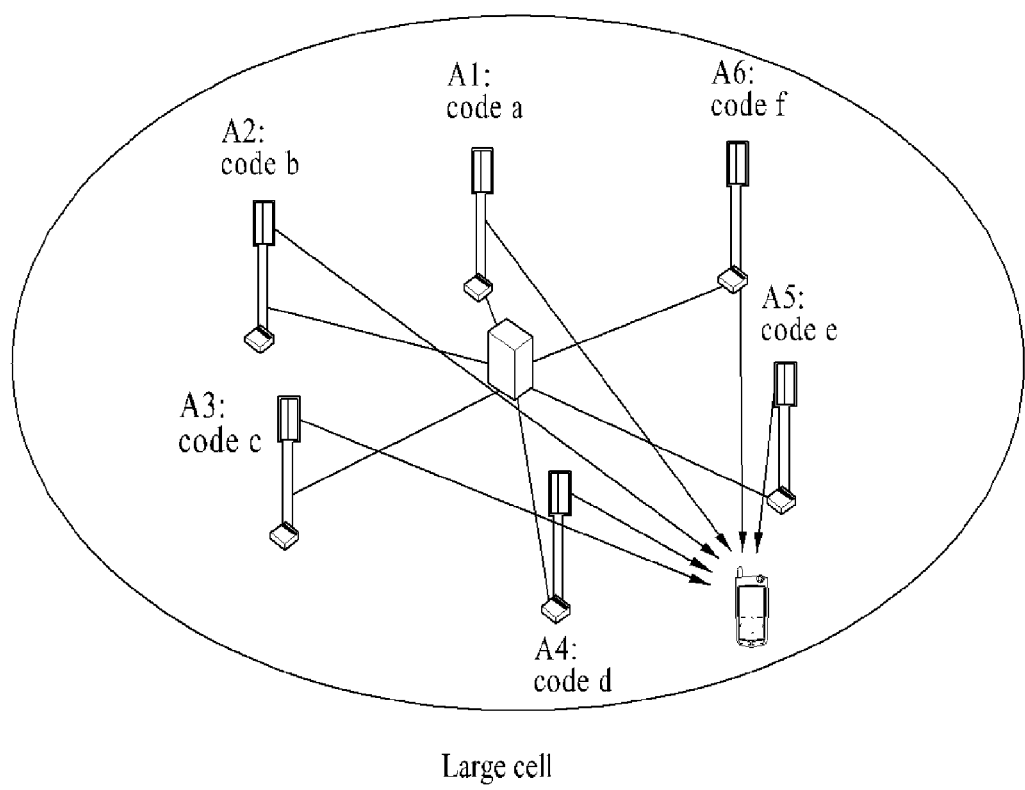

In the aforementioned embodiments of the present invention, a specific system does not need to support only one operation mode. In other words, the specific system can use a plurality of methods of transmitting a synchronization signal. FIG. 11 is a diagram illustrating that a specific system uses a plurality of methods of transmitting a synchronization signal.

As illustrated in FIG. 11, since propagation delay between distributed antennas is not great in a small cell, a method of transmitting a synchronization signal through a specific antenna can be used as illustrated in FIG. 6 or FIG. 7. Since a code reuse factor is not great in a large cell, a method of transmitting different codes through distributed antennas can be used as illustrated in FIG. 5. In this case, the code reuse factor can be prevented from being reduced in the small cell. Also, great propagation delay between the distributed antennas can be supported efficiently in the large cell, and the problem of coverage based on maximum transmission power can be prevented from occurring in the large cell.

Although the specific application examples of the primary preamble and the secondary preamble have been described in the embodiments of the present invention, the methods suggested in the embodiments of the present invention may be applied to the primary preamble and the secondary preamble differently.

Although the embodiments of the present invention have been described based on the distributed antennas, the embodiments may be described based on a group of neighboring antennas.

Figure 12:
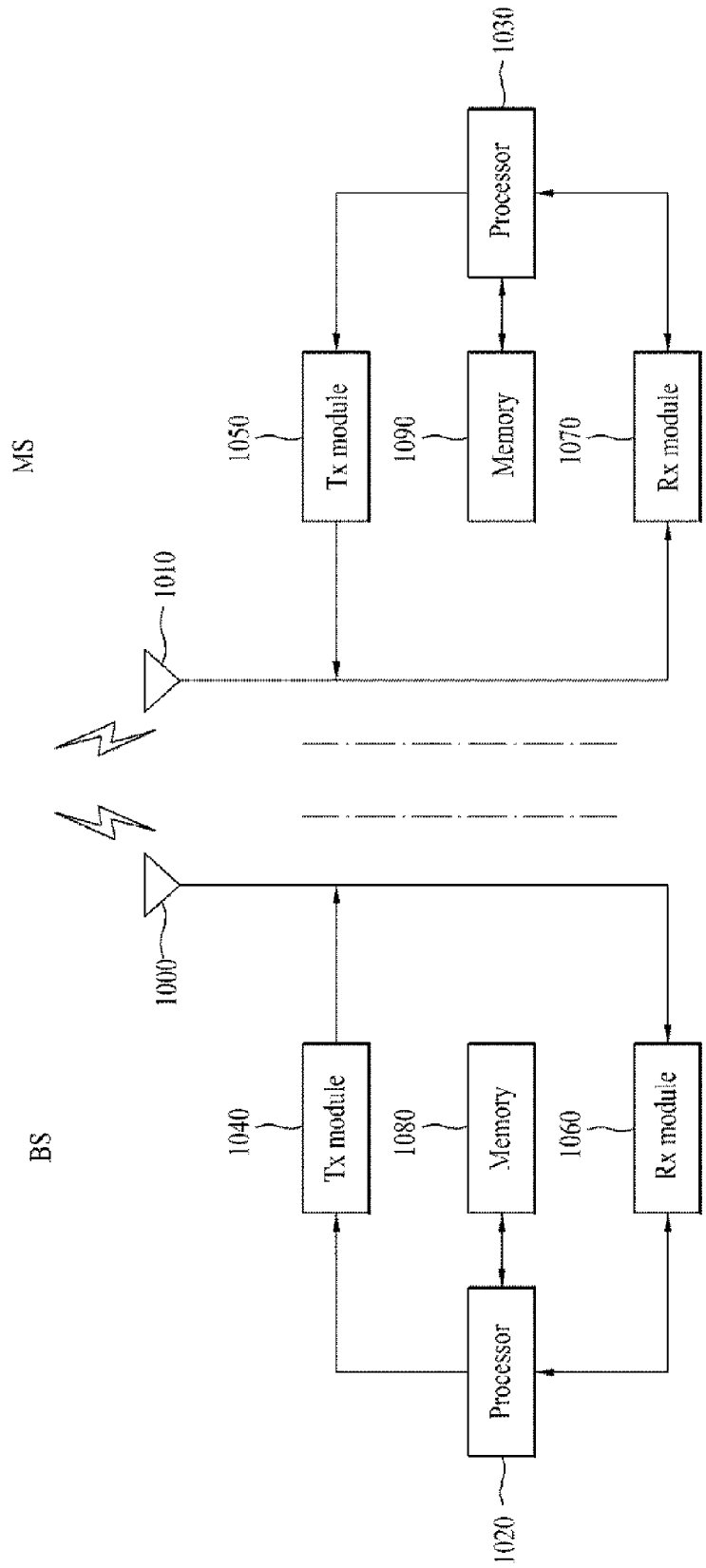
FIG. 12 is a diagram illustrating a configuration of a mobile station and a base station, in which the embodiments of the present invention can be carried out, in accordance with another embodiment of the present invention.

FIG. 12 is a diagram illustrating a configuration of a mobile station and a base station, in which the embodiments of the present invention can be carried out, in accordance with another embodiment of the present invention.

Each of the mobile station (AMS) and the base station (ABS) includes an antenna 1000, 1010 transmitting and receiving information, data, signal and/or message, a Tx module 1040, 1050 transmitting a message by controlling the antenna, an Rx module 1060, 1070 receiving a message by controlling the antenna, a memory 1080, 1090 storing information related to communication with the base station, and a processor 1020, 1030 controlling the Tx module, the Rx module, and the memory. At this time, the base station could be the femto base station or the macro base station.

The antenna 1000, 1010 serves to transmit a signal generated by the Tx module 1040, 1050 to the outside or receive a radio signal from the outside to transfer the radio signal to the Rx module 1060, 1070. If a MIMO antenna function is supported, two or more antennas may be provided.

The processor 1020, 1030 generally controls the whole operation of the mobile station or the base station. Particularly, the processor can perform a controller function for performing the aforementioned embodiments of the present invention, a medium access control (MAC) frame variable control function based on service characteristics and propagation condition, a handover function, an authentication and encryption function, etc. Also, the processor 1020, 1030 further includes an encryption module for controlling encryption of various messages and a timer module controlling transmission and reception of various messages.

The Tx module 1040, 1050 performs predetermined coding and modulation for signal and/or data, which are scheduled from the processor and then transmitted to the outside, and then transfers the coded and modulated data to the antenna 1000, 1010.

The Rx module 1060, 1070 performs decoding and demodulation for the radio signal received from the outside through the antenna 1000, 1010 to recover original data and then transfer the recovered data to the processor 1020, 1030.

The memory 1080, 1090 may store a program for processing and control of the processor, or may perform a function for temporarily storing input/output data (in case of the mobile station, UL grant allocated from the base station, system information, station identifier (STID), flow identifier (FID), action time, zone allocation information, and frame offset information).

Also, the memory can include at least one type of a flash memory type, a hard disk type, a multimedia card micro type, a card type memory (for example, SD or XD memory), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

The invention claimed is:

1. A method for synchronizing with a distributed antenna system (DAS) using two-steps synchronization, the method performed by a mobile station and comprising:
   receiving a primary preamble from a predetermined antenna of a plurality of distributed antennas of a base station of the DAS in a first period,
   wherein the primary preamble is transmitted using the predetermined antenna to avoid affecting reuse factor of the primary preamble;
   acquiring first synchronization for the predetermined antenna using the primary preamble,
   wherein the first synchronization is for acquiring large-scale synchronization with the DAS;
   receiving first secondary preambles from two or more antennas of the plurality of distributed antennas of the base station in a second period;
   selecting the antenna, which has transmitted a secondary preamble having the strongest signal intensity among the first secondary preambles, as a target antenna for acquisition of second synchronization; and acquiring the second synchronization for the target antenna using the first synchronization and the first secondary preambles transmitted from the target antenna, wherein the second synchronization is for acquiring synchronization with the DAS which is more accurate than the first synchronization.

2. The method of claim 1, wherein the first secondary preambles are different codes from one another.

3. The method of claim 1, wherein the first secondary preambles are the same codes cyclic-shifted by different cyclic shift values.

4. The method of claim 1, wherein the first secondary preambles are transmitted at different times.

5. The method of claim 1, wherein the first synchronization is that for the antenna which is previously defined, and the second synchronization is that for the target antenna.

6. The method of claim 1, further comprising changing the target antenna using the first secondary preambles.

7. The method of claim 1, further comprising:
receiving second secondary preambles from two or more of the plurality of distributed antennas of the base station; and
changing the target antenna using the second secondary preambles.

8. A method for transmitting synchronization signals from a base station of a distributed antenna system (DAS), the synchronization signals being used for a mobile station served by the base station for two-steps synchronization, the method comprising:
generating a primary preamble;
transmitting the primary preamble through a predetermined antenna of a plurality of distributed antennas of the base station of the DAS in a first period,
wherein the primary preamble is transmitted using the predetermined antenna to avoid affecting reuse factor of the primary preamble and is used to allow a mobile station to acquire first synchronization for the predetermined antenna using the primary preamble, and
wherein the first synchronization is for acquiring large-scale synchronization with the DAS;
generating secondary preambles; and
transmitting the secondary preambles through two or more of the plurality of distributed antennas of the base station in a second period,
wherein the secondary preambles are used to allow the mobile station to acquire second synchronization for a target antenna which has transmitted a secondary preamble having the strongest signal intensity among the transmitted secondary preambles, using the first synchronization and the secondary preamble transmitted from the target antenna, and
wherein the second synchronization is for acquiring synchronization with the DAS which is more accurate than the first synchronization.

9. The method of claim 8, wherein the secondary preambles are different codes from one another.

10. The method of claim 8, wherein the secondary preambles are the same codes cyclic-shifted by different cyclic shift values.

11. The method of claim 8, wherein the secondary preambles are transmitted at different times.

12. A mobile station configured to synchronize with a distributed antenna system (DAS) using two-steps synchronization, the mobile station comprising:
a receiving module configured to receive signals from a base station of the DAS; and
a processor configured to control the receiving module,
wherein the processor is further configured to:
receive a primary preamble from a predetermined antenna of a plurality of distributed antennas of a base station of the DAS in a first period,
wherein the primary preamble is transmitted using the predetermined antenna to avoid affecting reuse factor of the primary preamble;
acquire first synchronization for the predetermined antenna using the primary preamble, wherein the first synchronization is for acquiring large-scale synchronization with the DAS;
receive first secondary preambles from two or more antennas of the plurality of distributed antennas of the base station in a second period;
select the antenna, which has transmitted a secondary preamble having the strongest signal intensity among the first secondary preambles, as a target antenna for acquisition of second synchronization; and
acquire the second synchronization for the target antenna using the first synchronization and the first secondary preambles transmitted from the target antenna, wherein the second synchronization is for acquiring synchronization with the DAS which is more accurate than the first synchronization.

13. The mobile station of claim 12, wherein the secondary preambles are different codes from one another.

14. The mobile station of claim 12, wherein the secondary preambles are the same codes cyclic-shifted by different cyclic shift values.

15. The mobile station of claim 12, wherein the secondary preambles are transmitted at different times.

16. A base station of a distributed antenna system (DAS) for transmitting synchronization signals used for a mobile station served by the base station for two-steps synchronization, the base station comprising:
a transmitting module configured to transmit signals; and
a processor configured to control the transmitting module,
wherein the processor is further configured to:
generate a primary preamble;
transmit the primary preamble through a predetermined antenna of a plurality of distributed antennas of the base station of the DAS in a first period,
wherein the primary preamble is transmitted using the predetermined antenna to avoid affecting reuse factor of the primary preamble and is used to allow a mobile station to acquire first synchronization for the predetermined antenna using the primary preamble, and
wherein the first synchronization is for acquiring large-scale synchronization with the DAS;
generate secondary preambles; and
transmit the secondary preambles through two or more of the plurality of distributed antennas of the base station in a second period,
wherein the secondary preambles are used to allow the mobile station to acquire second synchronization for a target antenna which has transmitted a secondary preamble having the strongest signal intensity among the transmitted secondary preambles, using the first synchronization and the secondary preamble transmitted from the target antenna, and
wherein the second synchronization is for acquiring synchronization with the DAS which is more accurate than the first synchronization.

* * * * *